(12) United States Patent
Casarin et al.

(10) Patent No.: US 10,965,203 B2
(45) Date of Patent: Mar. 30, 2021

(54) ELECTRIC POWER GENERATING DEVICE

(71) Applicant: GEMAN DYNAMIC S.R.L., Malnate (IT)

(72) Inventors: Roberto Casarin, Gazzada Schianno (IT); Marco Lualdi, Busto Arsizio (IT)

(73) Assignee: GEMAN DYNAMIC S.R.L., Malnate VA (IT)

( * ) Notice: Subject to any disclaimer, the term of this patent is extended or adjusted under 35 U.S.C. 154(b) by 21 days.

(21) Appl. No.: 16/461,048

(22) PCT Filed: Nov. 15, 2017

(86) PCT No.: PCT/IB2017/057127
§ 371 (c)(1),
(2) Date: May 15, 2019

(87) PCT Pub. No.: WO2018/092032
PCT Pub. Date: May 24, 2018

(65) Prior Publication Data
US 2019/0280584 A1 Sep. 12, 2019

(30) Foreign Application Priority Data
Nov. 15, 2016 (CH) .................................... 01509/16

(51) Int. Cl.
*H02K 53/00* (2006.01)
*H02K 7/18* (2006.01)
*H02K 21/16* (2006.01)

(52) U.S. Cl.
CPC .................................. *H02K 53/00* (2013.01)

(58) Field of Classification Search
CPC ........... H02K 53/00; H02K 7/18; H02K 21/16
(Continued)

(56) References Cited

U.S. PATENT DOCUMENTS 5,925,958 A * 7/1999 Pirc ...................... H02K 49/102
310/112
8,400,037 B2 * 3/2013 Wojtowicz ............. H02K 53/00
310/152

(Continued)

FOREIGN PATENT DOCUMENTS

AU 2001100398 A4 * 11/2001
CH 707646 8/2014
(Continued)

OTHER PUBLICATIONS

International Search Report and written opinion dated Feb. 28, 2018 for PCT/IB2017/057127.

*Primary Examiner* — Jose A Gonzalez Quinones
(74) *Attorney, Agent, or Firm* — Silvia Salvadori

(57) ABSTRACT

The invention concerns a device comprising a fixed supporting structure (5) on which a plurality of permanent magnets (14-29) is provided, which surround at least partially a rotating shaft (32) supporting a rotor (2') provided with a group of magnets (13) adapted to interact with the magnetic field generated by the plurality of permanent magnets (14-29) of the fixed supporting structure (5), so that to produce a rotation of the rotating shaft (32) which allows an alternator (1) to be activated, where the device (100) further comprises a swinging-lever assembly (40) provided with a plurality of magnets designed so that traction and/or thrust effects are generated on the group of magnets (13) by the rotor (2') connected to the rotating shaft (32).

7 Claims, 6 Drawing Sheets

(58) Field of Classification Search
USPC .............................................. 310/46, 48, 96
See application file for complete search history.

(56) References Cited

U.S. PATENT DOCUMENTS

2010/0052330 A1* 3/2010 Rasmusen ............... F03D 15/10
290/55
2011/0095544 A1* 4/2011 Fijalkowski ........... H02K 53/00
290/1 R

FOREIGN PATENT DOCUMENTS

| CH | 713125 A1 * | 5/2018 | ............. H02K 53/00 |
| DE | 3123338 | 12/1982 | |
| DE | 3123338 A1 * | 12/1982 | ............. H02K 53/00 |
| FR | 551444 | 4/1923 | |

* cited by examiner

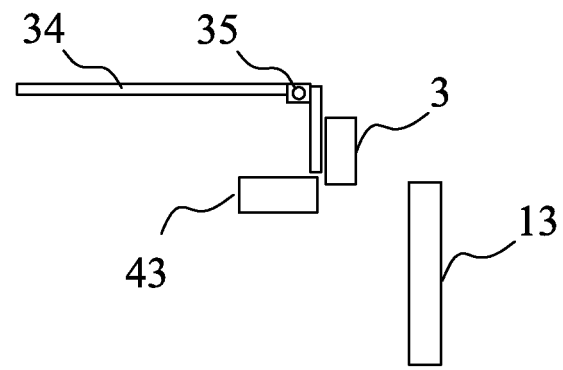
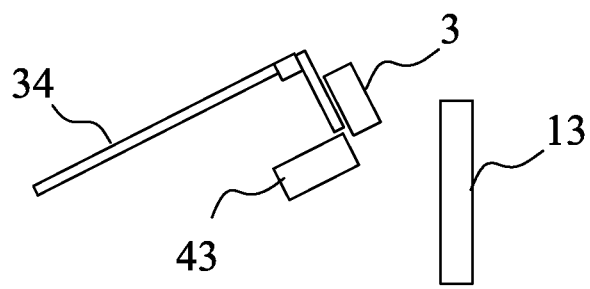
FIG.6
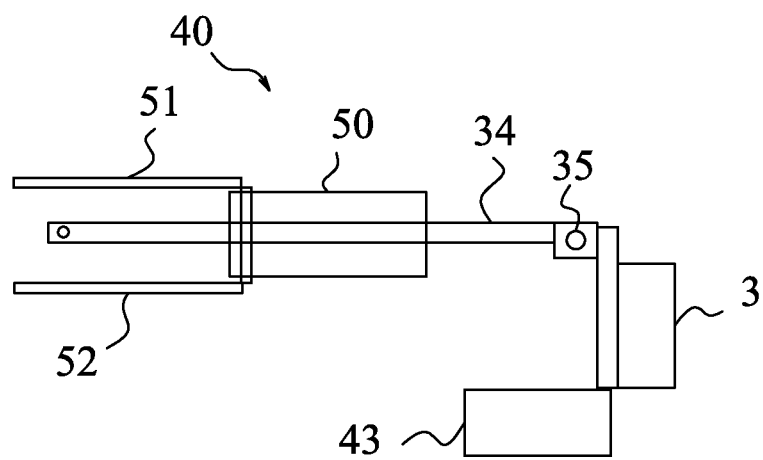
FIG.9

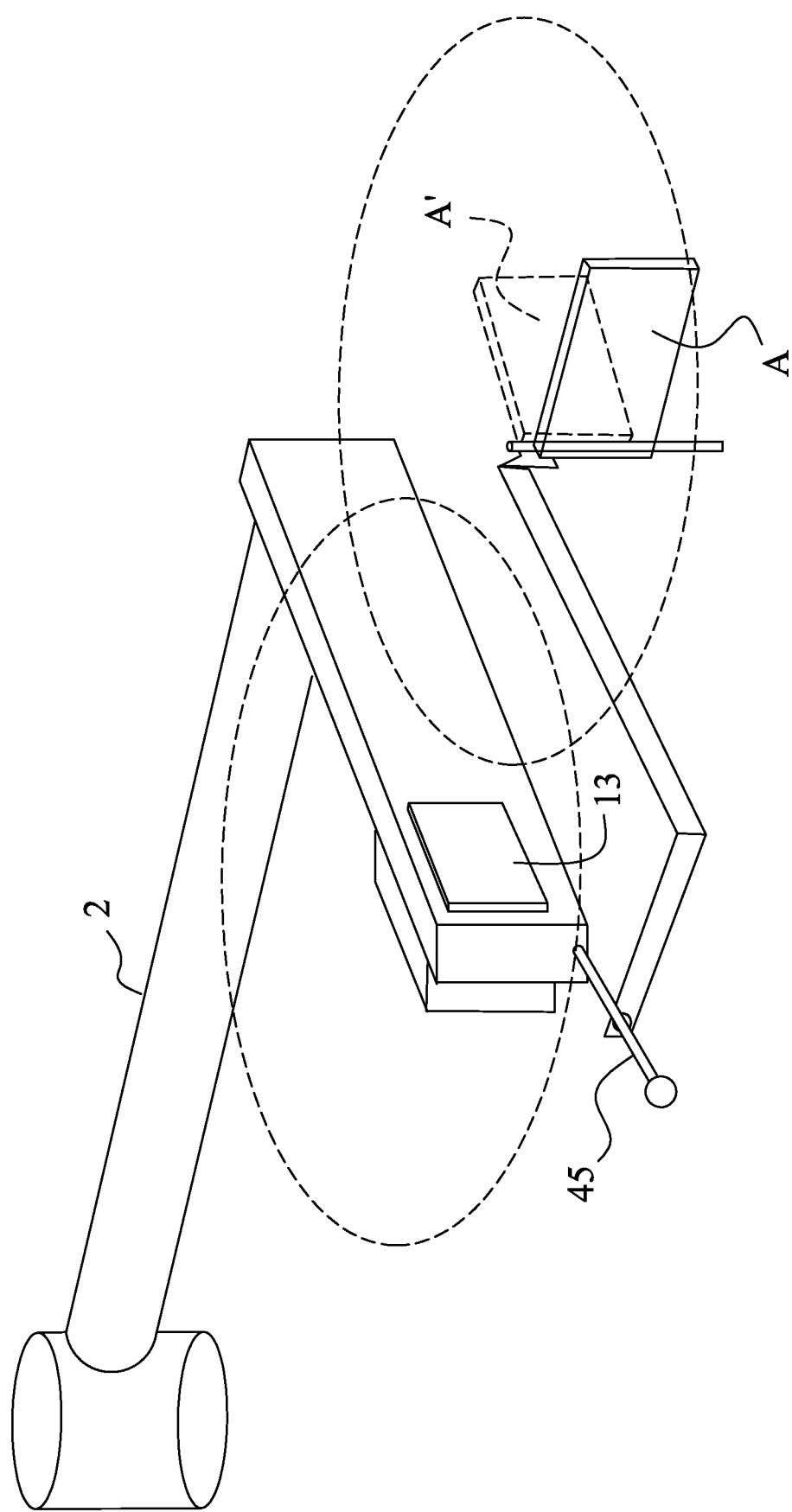

ELECTRIC POWER GENERATING DEVICE

This application is a U.S. national stage of PCT/IB2017/057127 filed on 15 Nov. 2017, which claims priority to and the benefit of Swiss Application No. 01509/16 filed on 15 Nov. 2016, the contents of which are incorporated herein by reference in their entireties.

FIELD OF THE INVENTION

The present invention reference in general to the field of electric power production; more particularly, it refers to the adjustment of the voltage and current outputs from alternators and dynamos.

KNOWN PRIOR ART

Briefly, it is mentioned that reference to electric machines is generally directed, in the following document, to synchronous motors and alternators wherein a stator, with main winding, is inductively coupled to a main magnet/rotor being in alternating or direct current regimen.

For example, in DC motors the rotating system consists of an assembly of coils which are wound on an iron cylinder, named rotor, this allows a uniform rotary motion to be obtained and to transfer it to other mechanical parts by a shaft connected to the rotor.

In principle an alternator (e.g. of single-phase type) is on the other hand formed by a sort of fixed spool, named stator, acting as a support for some coils connected in series. The magnetic field is generated by one or more electromagnets constituting the rotor, i.e. the rotating part of the alternator. When the poles of the electromagnets pass in front of the stator coils, the latter produce induced electromagnetic forces adding to each other, due to the series connection. Such geometry of the system makes all the electromagnetic forces time-oscillate with the same phase, to provide an output having homogeneous voltage/current magnitude.

In the third millennium, after the experiences and consequences of hectic technological progresses in the last century, the feelings for the environmental respect, useless waste of planet power sources and resources has so much sharpened to characterize the technological development of current years.

Generator necessities are ever-increasing, just because of the sharpened feeling for environmental protection, particularly for synchronous ones having little or medium sizes, however lacking with offers and having high prices.

Document CH 707646 describes an electric power generator with magnetic field reversal acceleration effect, which comprises a fixed supporting structure for N magnets placed along an arc of circumference so that a space-time interval is available for the activation by a rotary station having the function of starter and synchronized accelerator. The positioning of the N fixed magnets produces a magnetic field from which the rotor traction is obtained, by the magnetic coupling, which provides for transforming the induced magnetic energy to rotary motion in turn used for moving a dynamo. In the center of the arc of circumference a central pin is placed, from which a rotating arm of a rotor extends and to which a dynamo head is assembled. The rotating arm supports, at its outer end, a slide carrying the magnets and constituting the rotor.

However such a known device, still having remarkable energy efficiency, has room for further improvements.

An object of the present invention is to provide a system for producing electric power by electric power generating apparatus having medium and little size.

Furthermore, object of the present invention is to achieve high reliability with extreme lowering of maintenance activities or, at least, so that the latter become necessary after very long on-times.

Another object of the invention is to improve the efficiency of the device described in document CH 707646.

Finally, object of the present invention is to provide an electromechanical machine for adjusting the electric power the machine can supply, which uses construction elements, materials and technologies standard in the field of electromechanical constructions, and has low costs and is easy to install and maintain.

BRIEF SUMMARY OF THE INVENTION

These and other objects, which will be evident during the description, are achieved by a device comprising a fixed supporting structure on which a plurality of permanent magnets is provided, which surround at least partially a rotating shaft supporting a rotor provided with a group of magnets adapted to interact with the magnetic field generated by the plurality of permanent magnets of the fixed supporting structure, so that to produce a rotation of the rotating shaft which allows an alternator to be activated, characterized in that the device further comprises a swinging-lever assembly fastened to the supporting structure and provided with a plurality of magnets designed so that traction and/or thrust effects are generated on the group of magnets by the rotor connected to the rotating shaft.

An advantage of this solution is that it operates as an auto-recharging system making use of the magnetic field energy contextualized by the magnet arrangement.

Further characteristics and advantages of the invention can be deduced from the dependent claims.

BRIEF DESCRIPTION OF THE FIGURES

Further characteristics and advantages of the invention will be evident by reading the following description provided for illustration purposes and without limitation, with the aid of the figures illustrated in the attached tables, wherein:

FIG. 6 schematically depicts the effects of the swinging-lever assembly with respect to the rotor orbit;

FIG. 7 schematically depicts the interaction of the magnetic fields between the rotor and the swinging-lever assembly;

FIG. 9 schematically depicts the swinging-lever assembly and the respective servocontrol.

DETAILED DESCRIPTION OF SOME EMBODIMENTS OF THE PRESENT INVENTION

Figure 1:
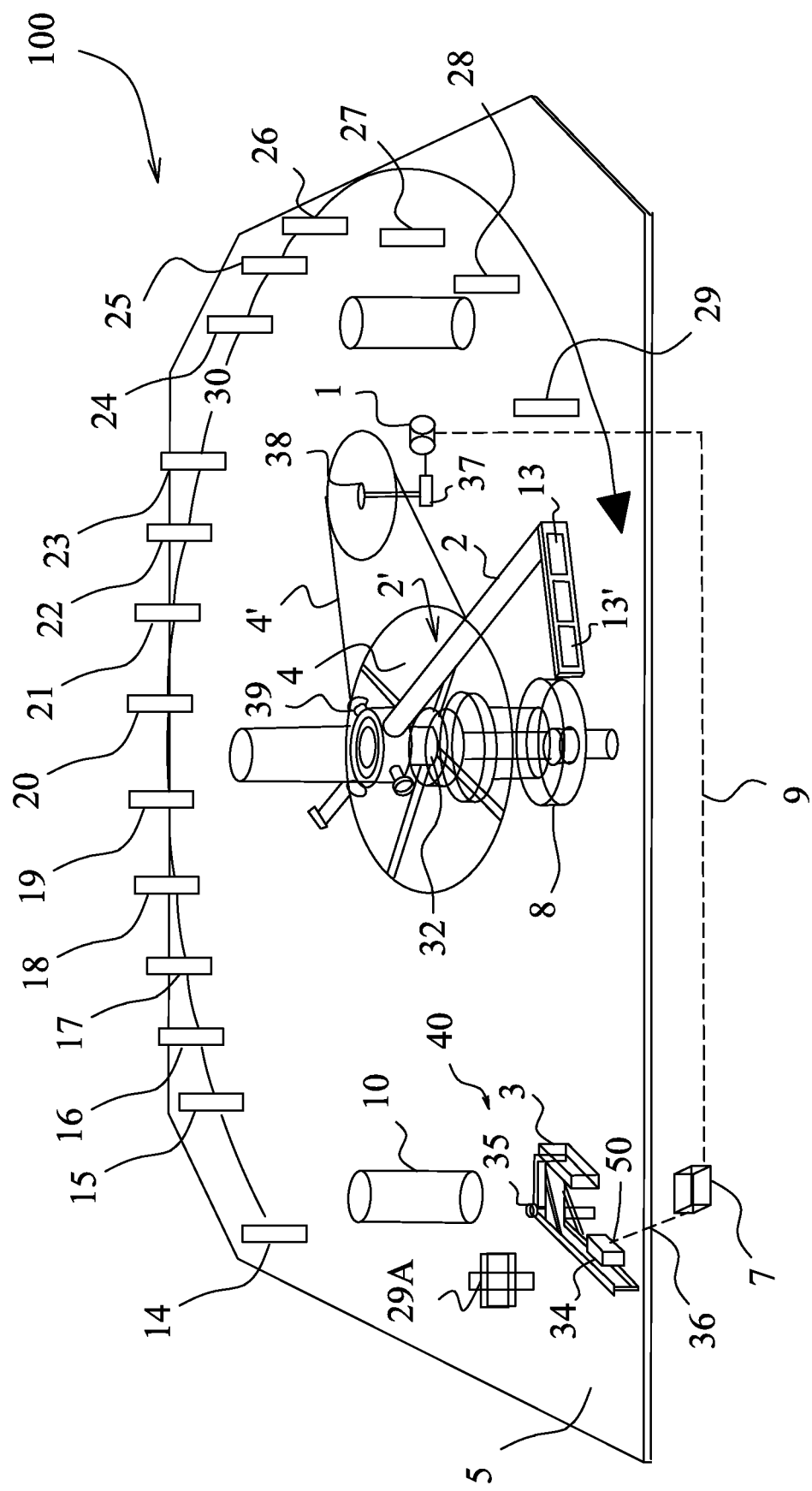
FIG. 1 schematically depicts a generating device according to an implementation of the invention.

FIG. 1 schematically depicts a device generating electric power according to an embodiment of the invention, denoted with numeral reference 100 on the whole.

The energy device 100 comprises a fixed supporting structure 5 on which a plurality of permanent magnets 14-29+29 A is arranged.

The permanent magnets 14-29 è 29A are each arranged on a respective fixed support; in FIG. 2, better described in the following, a support 14' for the magnet 14 is depicted.

Figure 5:
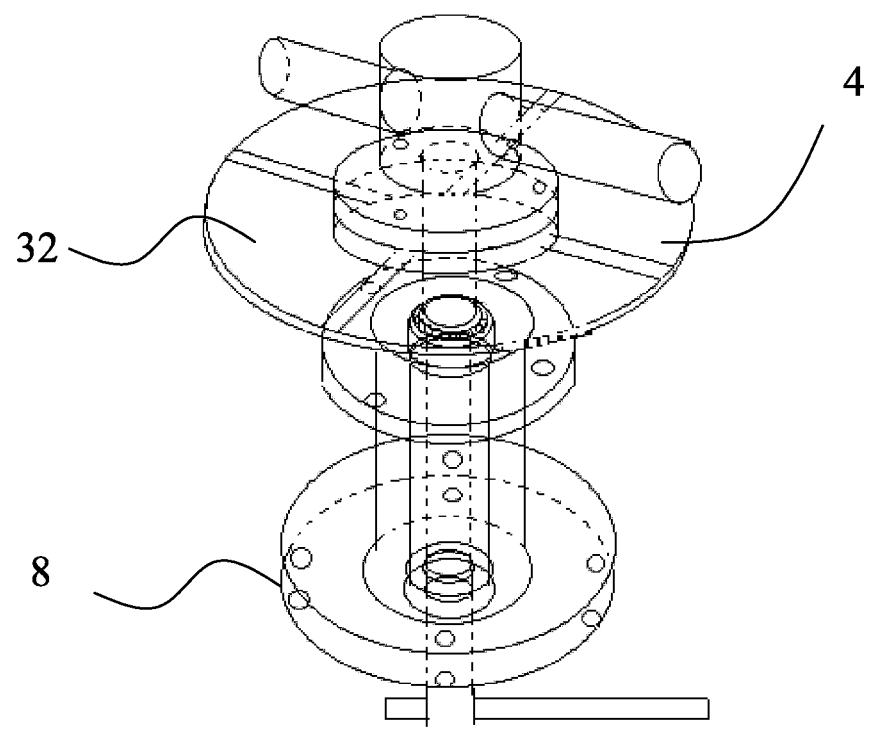
FIG. 5 schematically depicts a coupling between a drive shaft supporting the rotor and a stabilizer belonging to the device.

The device 100 further comprises a rotating shaft 32—visible in detail in FIG. 5—which supports a tubular arm 2 provided, at an end thereof distal from the rotating shaft 32, with an orbital group of magnets 13, the latter being adapted to interact with the magnetic field generated by the plurality of permanent magnets 14-29 of the supporting structure 5, so that to cause a rotation of the rotating shaft 32.

The number of magnets 14-29+29A is 38, in the following typology, but the number can vary in different arrangements, the magnets being subdivided in 17 supporting position placed in a circular way around the rotating shaft 32 along a circumference portion denoted with the numeral reference 30 in FIG. 1.

The rotating shaft 32, in its turn, has a crown wheel or, alternatively, a gear wheel 4 connected by a transmission chain 4' to a pinion 38 that rotates a transmission 37 in turn connected to an alternator 1. The alternator installed in the following unit whose Application has been filed, consists of 16 neodymium magnets connected to the main rotating shaft with 1:1 rotation ratio and interacting with the respective coils, which are described in the following and specifically made.

Preferably, the transmission ratio between the crown wheel 4 and the pinion 38 is 4:1, whereas the transmission ratio assured by the transmission 37 interposed between the pinion 38 and the alternator 1 is 1:1, consequently the head of the alternator rotates 4 times the number of turns of the crown wheel 4 of the rotating shaft 32. Such technical solution can be used in case of alternator apparatuses that, once installed or able to be installed, need a speed increase not indispensable as basic properties of the finding of the present invention, in order to have high number of turns of the alternator system. A further technical option is available, even if evaluable depending on different technical configurations of production needs of electric power, by applying an 6V electric motor connected to the main rotating shaft by a drive belt having diameter of 5 mm, such a device interacting through a 0.30 tenths of second time pulse, by connecting the motor to the main shaft through a couple of Teflon pulleys having suitable diameter, each of them providing a constant rotation and acceleration added to the already existing magnetic thrust; such a system allows the constant rotation anyway remaining inside the energy parameters used at the thrust integration and well under the overall energy the system produces, the afore described systems have to be considered as integrating options not vital to the functionality of the principle of the invention device.

The magnets 14-29+29A are constituted by neodymium and are nickel-plated and sintered from permanent magnetism rare-earths. In fact, currently it is now that permanent magnet synchronous machines, thanks to the features of modern magnets "NdFeB" (nickel-plated rare earths), reach high outputs and are very reliable as they have no collectors (brushless).

In particular, the tubular arm 2 has at its end a rectangular grooved support 13 made of aluminium for supporting the magnets 13 and forms a rotor 2' with it.

These magnets have preferably variable number depending on the thrust needs and form the rotating part of the rotor on which the magnetic field has effect, which magnets solve the torque or thrust needs contextually and cyclically in combination with the magnets 14-29+29A of the supporting structure 5, interacting with the circular magnetic field.

Such a magnetic field is made of 30 and a half magnets fastened in their position and conveniently spaced by the consequent assembly, also subdivided in different blocks, and the specific geometry experienced due to the dynamic response and, successively, during the one-by-one assembling, in order to facilitate the consequent and optimal magnetic interaction and the consequent abatement of dissipative forces the rotor can store up.

During the rotation of the rotor 2', the poles of the single magnets are placed in a traction position towards the rotor magnets, i.e. the positive polarity (+) towards the negative polarity (−).

The magnets used in implementing the device 100 are preferably all of the same type, although they have 10 mm length and thickness variations for the circularly arranged magnets, and they are constituted by neodymium material and are nickel-plated and sintered from permanent magnetism rare-earths with sizes between 50 and 60 mm in the longest side, 20 mm width and 5 to 10 mm thickness, for what concerns the magnets in the swinging-lever assembly 40 and the magnet support 13' of the rotor 2', whereas for the circularly arranged magnets the sizes change with equal features, i.e. they are 60 mm length, 20 mm width and 5 mm thickness, with 18 kg traction or load capacity per each sector.

Moreover, the number of circularly arranged magnets can vary depending on their support, from 1 to a maximum of 5 per each support.

Obviously, the efficiency performances and loading values are verifiable and currently can be consulted by documentary certifications of producers of such magnets.

Relating to such magnets one more clarification is necessary, particularly relating to technical features and duration of their magnetic field.

This technical clarification is convenient since the magnetic charge of the circularly arranged magnets 14-29+29A constitutes the fuel-like element, (although it is not fuel), therefore the energy of the device 100 comes from the direct interaction of the magnetic field, whereby the decay time of the magnets is the functional and operative ranges of the device 100.

Figure 2:
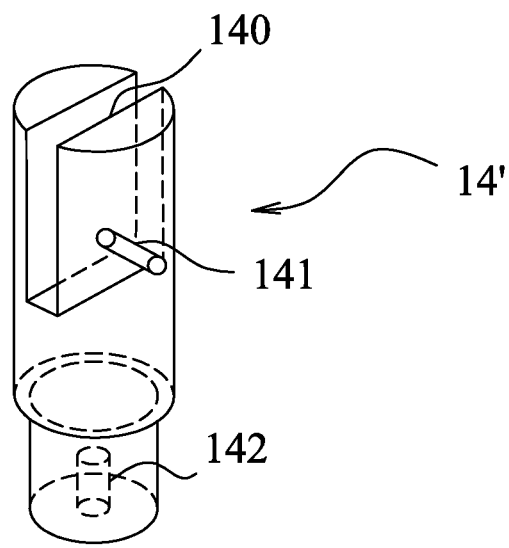
FIG. 2 depicts a support for the magnets which belongs to the device of FIG. 1.

To better show the arrangement of the magnets 14-29+ 29A, FIG. 2 depicts a support 14' for magnets, which belongs to the device of FIG. 1.

The support 14' relates to the magnet 14 and has a substantially cylindrical shape, where a molding acting as a seat 140 for containing the magnet 14 (for sake of simplicity not shown in FIG. 2) is obtained.

There is also a threaded through-hole 141 for a screw (not shown), which locks the magnet 14 in the seat 140.

The support 14' can be in turn screwed to the plane of the supporting structure 5, by making use of a threaded hole 142 obtained therein.

Figure 3:
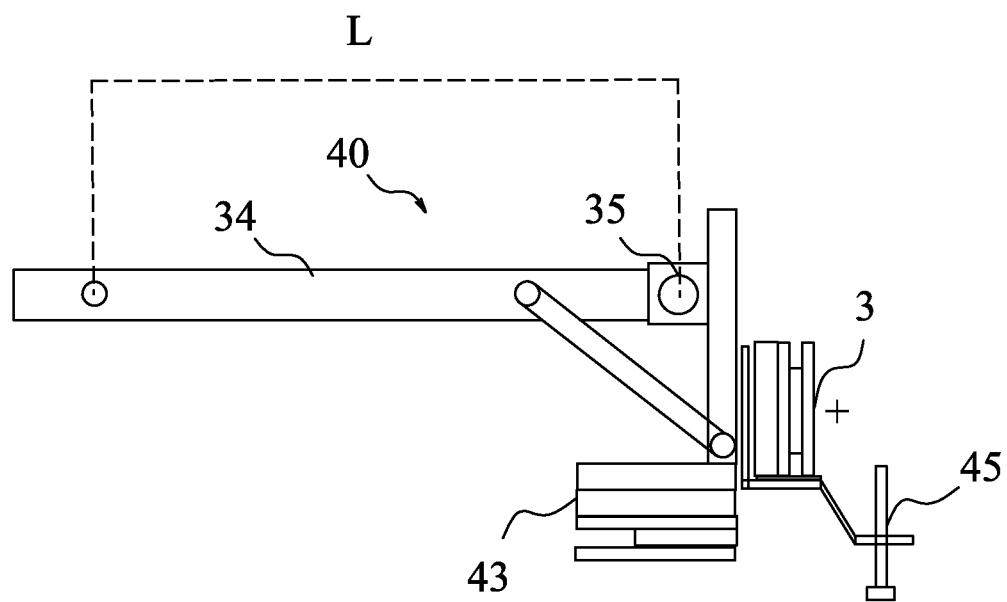
FIG. 3 depicts a swinging-lever assembly provided with a plurality of magnets, which belongs to the device of FIG. 1.

On the other hand, the swinging-lever assembly 40 is visible in FIG. 3 with greater detail.

The swinging-lever assembly 40 is provided with a plurality of magnets 3, 43 and has an advantageous first class lever having an arm 34 pivoted to a fulcrum 35 and fastened to the supporting structure 5.

The swinging-lever assembly 40 also has a braking screw 45.

In particular, in the swinging-lever assembly 40 the magnets 3 with positive polarity (+) operate as traction magnets, whereas the magnets 43 with negative polarity (−) operate as thrust magnets towards the rotor.

In particular, the swinging-lever assembly 40 can provide 7 magnets of which 3 have traction function and positive polarity (+) with respect to the rotor, and 4 magnets with thrust function and negative load (−) with respect to the rotor.

As known, the thrust function happens since two magnets, if moved closer with the same polarity tend to repel, whereas the traction function happens since the two magnets with different polarity, if moved closer, tend to attract one another.

Such swinging-lever assembly 40 provides, by controlling and conveniently interfacing the management control electronic of the device, a thrust by the magnetic field when the negative polarity of the rotor interfaces with the negative polarity of the thrust magnets and fulfills the cyclo-dynamic management of the device.

Figure 4:
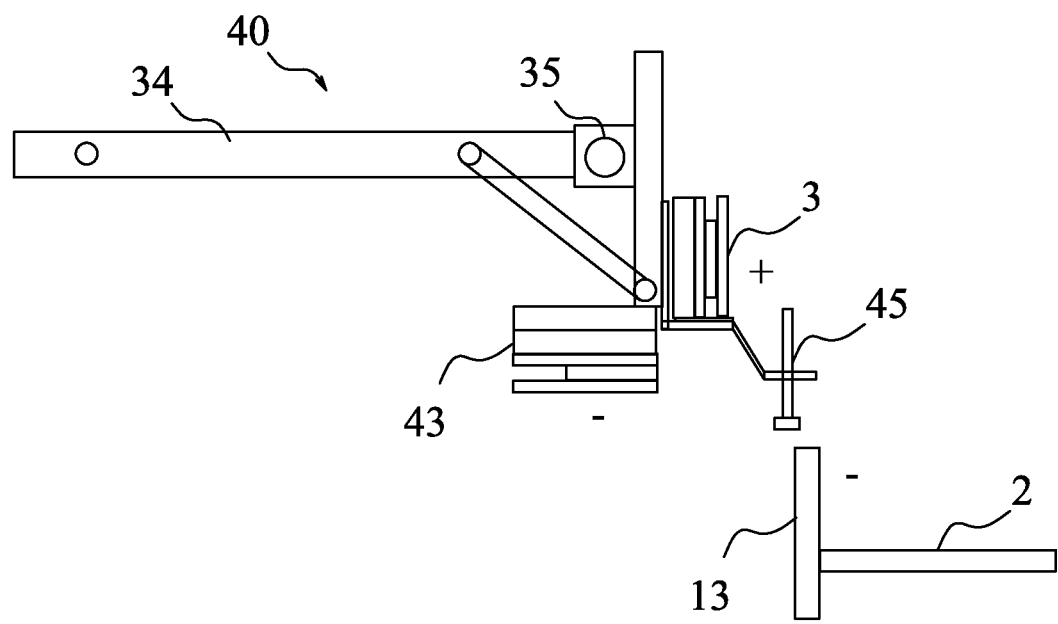
FIG. 4 depicts the swinging-lever assembly of FIG. 3, shown in cooperation with a rotor belonging to the device of FIG. 1.

FIG. 4 depicts the swinging-lever assembly of FIG. 3, shown in cooperation with a rotor belonging to the device of FIG. 1.

As stated in the discussion of the background art, the electric power from the mains and therefore from transformation produces what is named Electromotive Force (EMF) of current electric motors, i.e. the initial thrust and the rotationally keeping and work.

In the device 100 described, such a force contextually described and verifiable as cause- and effect agent with the definition of Magnetomotive Force (MMF), in the present description is redefined in order to differentiate the induced energy used to provide an electromotive force, therefore from the mains, from what that provides, by magnetomotive force, a magnetomotive force without supplying from the mains, but by the effect of the geometrical arrangement of the magnets of the device 100.

Such magnetomotive force is provided by the sequence Traction—Action—Repulsion—caused by the swinging-lever assembly 40 and its gradually balanced rotation, as well as its geometrical arrangement of the magnets 14-29+29A.

If a comparison is possible, the operative rotation conditions can be compared with a manual carousel that, in order to be rotated, is subject to a first thrust by the force a user applies at its outer diameter, which in the present device is determined by an optimal thrust power due to the interaction with the swinging-lever assembly 40 attracted and provided with the necessary power by the first supporting block of magnets from the first magnetic block, consisting and determinable in a distance between the fulcrum 35 of the swinging-lever assembly 40 and the first circularly arranged magnet 14.

In an implementation of the device 100 such a distance is preferably of 187 mm, whereas the rotor is locked in the traction equilibrium point by the magnetic force effect of the magnets being in the swinging-lever assembly 40 that, by its magnetic field force, applies a traction stopping the rotor, which are installed on the swinging-lever assembly 40 while the rotor brake keeps the same still.

The magnets of the swinging-lever assembly 40, as they compress the magnetic field by using a first class lever and a rotary motion cyclically provided by a servocontrol 50, try to repulse the magnets of the rotor and they increase the energy available for the starting initial pickup, (condition similar to a catapult for throwing airplanes from an aircraft carrier).

In this case, the rotor 2' placed in a condition of magnetic action and contextual traction, may start its rotation by storing up potential and thrust energy (similar to a torque value), as soon as the swinging-lever assembly 40 will have completed the necessary rotation, which is preferably a 42 degrees rotation by the servocontrol 50.

The swinging-lever assembly 40 escapes from a lock condition or position due to the obstruction of a screw 45 along a rotation path and placed forward in front of the rotor 2'.

If the traction magnets and the brake are moved away at the same time by a semi-rotation, contemporaneously the thrust magnets, therefore having the same polarity of the magnets on the rotor, move closer to the rotor itself and cause a simultaneous action of the magnetic field being on both the rotor and swinging assembly components, thus providing an energy (or MMF) generating the thrust sufficient to overcome the contrary force provided by the resistance of the alternator against the rotation and to the resistance load of the alternator in producing electric power, in the present device consisting of a verifiable voltage from a minimum of 3 volts to a maximum of 8 volts, and to keep the rotor rotating continuously by a frequency of sequential (or cyclic) opening, the servocontrol 50 provides, with 50 to 80 millisecond opening and closing time of the swinging-lever assembly 40 that can be adjusted in the complete opening/closing cycle.

FIG. 6 schematically depicts the effects of the swinging-lever assembly with respect to the rotor orbit.

In FIG. 7 two angular positions of the swinging assembly 40 are shown, one being denoted with A for locking the rotor and the other one, denoted with A', for moving the rotor 2' away and consequently unlocking the same.

In this case, the number of turns the rotor 2' makes is below a threshold from a 40 rpm minimum to 60 rpm maximum in the currently used configuration that, if a comparison is possible, is similar to person applying a thrust to keep the rotation of a carousel every time the push handle passes, so that the electric power production may be fulfilled in accordance to the parameters visible from the alternator features, keeping the rotor apparatus of the alternator at a constant turn value by repetitively activating the opening cycle/magnetic field operation and closing of the swinging-lever assembly 40.

The swinging-lever assembly 40 is preferably made of aluminium.

A steel pin passes therein and has 5 mm diameter, which can be identified also due to its positioning in relation to the design and the same box-shaped assembly, as well as to the position and the operative output similar to a lever fulcrum in an advantageous lever type.

The assembling of such traction and thrust magnets in the swinging-lever assembly 40 takes an angular shape visible in FIG. 3.

It has to be mentioned that, in addition to the pickup power or torque, by the interaction with the thrust power the servocontrol generates, the advantageous lever type provides further and significant increase of the available energy in addition to the movement servocontrolled by the first group of magnets in the first support which, since they have polarity opposite to those interfacing by moving closer with the rotation of the swinging assembly, aid an increase of the speed and rotation force of the swinging-lever assembly.

In this way the energy consumption by the servocontrol 50 in the thrust step will be significantly lower than the energy necessary to applying a higher force.

In fact, for example, if the rotor 2' is moved away manually from its stop and equilibrium point in front of the swinging-lever assembly 40, this would tend to rotate autonomously due to the traction effect of the magnetic field the magnets placed in the first position apply. In this connection, in a further technical development step of the device, by making use of the lever effect applied by the block of magnets placed after the first class lever providing the described effect if used, it is possible to use a further acceleration lever effect by balancing the magnet block simply by handling the rotor stop space and the respective distance from the start traction magnet block by making use of a little electric motor compensating the servocontrol, it is possible to obtain a similar magnetic lever supporting the rotation power and a rotation homogeneity in which the sum of the values of torque and rotation is similar to the power supply of the first class lever in the description, therefore, summarizing, the possibility of using a system making use of the torque pickup without the compression effect whereby the function of the servocontrol 50, although integrating the power necessary to the rotational thrust, cannot be quantifiable from the power point of view, in the supply of the total power necessary for keeping the rotation, since the higher load of power used by the servocontrol 50 is used, therefore taken away, for the self-keeping in the constant rotation function the alternator system made in order to return the swinging-lever assembly 40 to the start position.

In order to provide further points regarding the function and the novelty features of such a device, it is anyway necessary to pause over the length L of the lever 34 and the relative positioning at the fulcrum 35, which are expressly studied to allow the servocontrolled device possibly driven by a service auxiliary accumulator 7 to make such a MMF combination+advantageous lever to allow a thrust for the device higher with respect to the energy the servocontrol 50 uses and a lower effort thereof in order to return the swinging-lever assembly 40 to the start position.

For sustaining what described above, it may be useful to remind that a first class lever is advantageous if the required applied force is lower than the resistant force, i.e. if the resistant arm is shorter than the effort arm.

Figure 8:
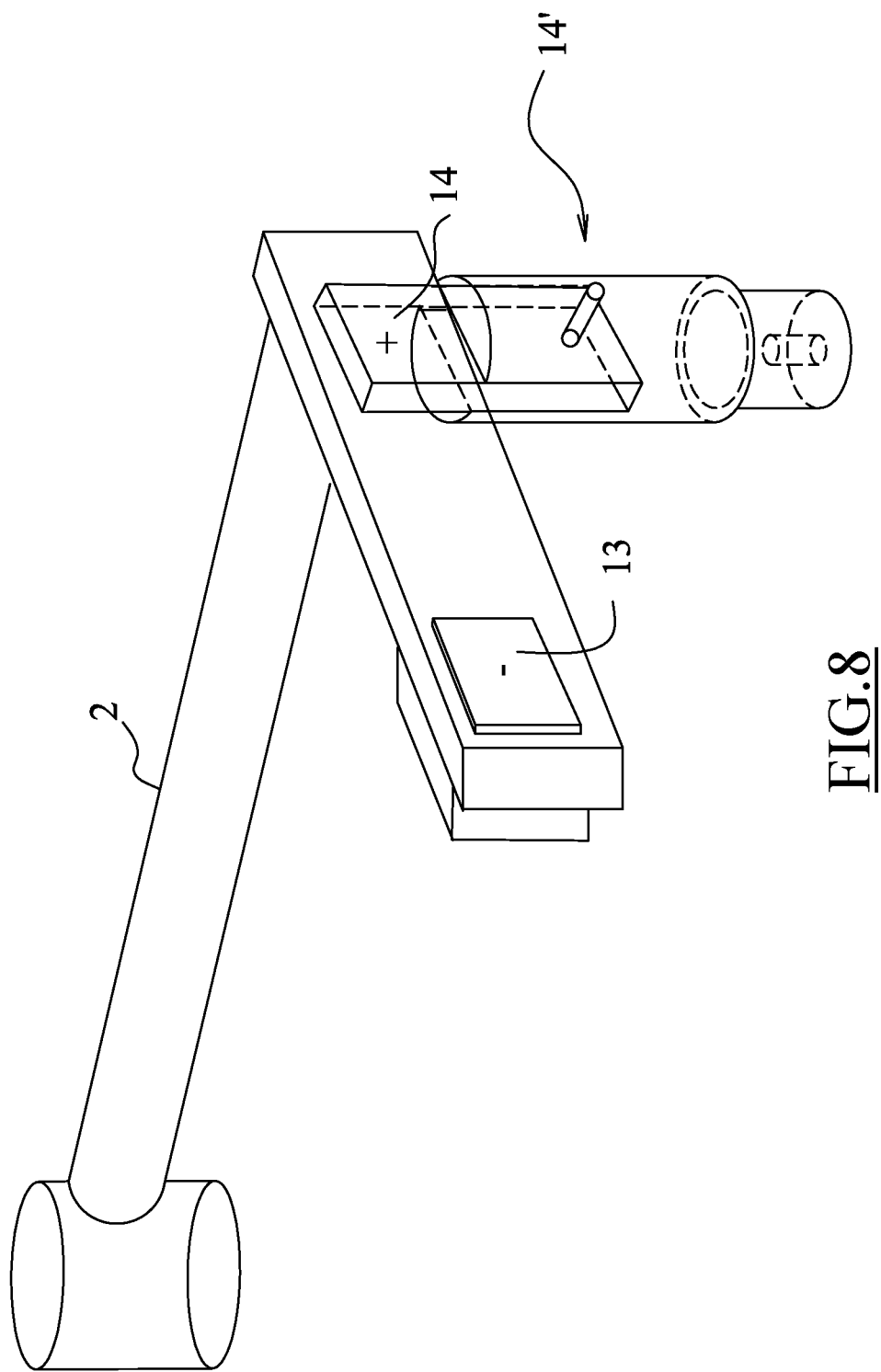
FIG. 8 schematically depicts the interaction of the magnetic fields between the rotor and a magnet on its own support.

FIG. 8 schematically depicts the interaction of the magnetic fields between the rotor and a magnet on its own support.

FIG. 9 schematically depicts the swinging-lever assembly 40 and the respective servocontrol 50.

The swinging-lever assembly 40 has a 5 mm stainless steel pin passing through two bearings fastened inside the afore said swinging-lever assembly 40 and allowing the angular rotation thereof.

The angular movement of the swinging-lever assembly 40 is provided by a servocontrol 50 being supplied at 1600 milliamperes by a series of 6 V rechargeable batteries and cooperating with a forth lever 51 and a back lever 52.

The force necessary for the angular movement of the swinging-lever assembly 40 the servocontrol 50 applies is further increased by the presence of the first circular magnet support, which consists of 4 magnets having polarities opposite to magnets being on the left side of the swinging-lever assembly 40; once the rotation of the servocontrol 50 and the respective swinging-lever assembly 40 is started, by their traction force they apply a rotation thrust force of the swinging-lever assembly 40 together with the servocontrol 50.

The batteries, in turn, are recharged continuously by drawing the necessary energy, compared to their consumption, from the apposite main accumulator 11 supplied by the alternator 1 installed in the present device 100.

The alternator 1 is provided with the following power production capability, as the producer statement, to which an invert unit (optional) could be combined with, if necessary, together with suitable sizing of the appropriate connecting plant electronics. The alternator apparatus will be made and contextualized depending on necessary technical specifications of the device of the invention, the alternator coils are made without employing ferrous materials, but only copper coils specifically made by calculating the number of copper windings necessary for reaching the production of electric power the performance of the invention device requires, and they could change depending on the required model, such as a 220 V 3 Kw device intended for the property field, or a 14 V device intended for the Mobile Recreation field. However, in any case, the coils will be used without the supply of ferrous or ferromagnetic materials in their inside

* rated power 14 Volts
* maximum power 14 Volts
: 3 to 14 AC Volts
* efficiency speed Max 50 rpm
* number of poles 2.

In order to summarize the novel concept obtained by the present invention: it is a dynamic inertial system and autonomous because the MMF-induced motion by thrust and magnetic rotation is given by two operatively arranged magnetic sectors, which support and transfer the MMFs-generated rotational dynamic work, which is mechanically transformed by a rotor and can be described as centripetal force, to an alternator for the production of electric power depending on the afore stated values, hence the peculiarity of energy used for executing the mechanical work as energy not coming from transformation but interaction of the available magnetic field.

Consequently, the supply is not necessary, which is caused by the relative energy transformation since the system will be able to autosupply autonomously and independently by drawing a little part of energy necessary for its operation from the interfaced accumulator (6 V not cyclically managed), whereas the remaining energy could be stored and used for further service requests.

The synthesis of the invention is in the paradigm of the action of the magnetic field by lever and the cyclically managed magnetic field+supporting circular sectional magnetic field=continuous rotary motion.

In relation to the type of energy used in the present device 100, since the achieved principle anyway uses an energy typology drawn from the magnetic field to produce its dynamics and, consequently, the machine work, in the present disclosure the herein described device uses a verifiable operation logic and, therefore, power, force and rotation speed values and other features and values, i.e. quantifiable and verifiable stated technical data.

It may be useful, in terms of uptime capability estimates, what is reported by publications and theses as well as technical data provided by the industry making the magnetic sectors, where it is argued that if magnets are not subject to a rise of their own temperature during their use or they do not undergo, beyond a certain temperature threshold, vibrations or other improper uses in addition to a 3% drop immediately after they have been prepared.

The duration of their magnetic charge may be reasonably estimated in decay perceptible only after many years.

The magnet capability of keeping up a magnetic field is due to magnetic domains locked in their positions by the material anisotropy.

Once the initial magnetizing field has been removed, the domains keep their position until the action of outside forces greater than those keeping them stationary.

The energy required to alter the field produced by magnets varies greatly for each type of material. The stability may be described as the "possibility of achieving, from the magnet, the same performance for its whole life".

As previously stated, the factors influencing the stability are time, temperature, reluctance changes, demagnetizing fields, radiations, stresses and vibrations.

The time effect on modern permanent magnets is little; greatest changes occur immediately after the magnetization. These changes, known as magnetic dragging, occur due to instable domains suffering from thermal fluctuations and, by limiting their number, changes are reduced too. From this point of view the best behavior is that of rare-earth magnets, whereas AlNiCo can lose at maximum 3% of its own flow density after 100,000 life hours.

Carrying on in the description of the afore mentioned device and in order to provide information of technical-function logic, the widest possible of the same device, a further elucidation is necessary about the compensation capability of the whole made device 100 thus reducing the effects on the system named as Dissipative or not conservative Forces, such as the dynamic mechanical friction, the aerodynamic resistance of a moving body, or the gravity force on our planet.

In the device 100, in order to counter or anyway limit the incidence of mentioned forces, trying to redefine and counterbalance their effects taking away power from each machinery or technical implementation, the appropriate novel counter-measures in the device 100 are employed by virtue of its special configuration.

For sustaining what referred above in relation to the reductions of energies and forces mentioned in the device 100, after the motor 2' has been started by the action of the magnetic field and the consequent increase due to the action of the respective magnetic fields with the MMF-generated capability increase and dynamically interacting on the rotor in the device 100, the rotary motion of the rotor is substantially sustained also by the convenient magnetic arrangement of the magnets 14-19+29A.

In order to comprise the cause-effect for the rotor of the device 100, and therefore the advantage in terms of reduction of friction force, which is both mechanical and aerodynamic of the specific rotor used, there is the need of exposing the mechanic energy conservation principle or Torricelli's theorem stating that, by considering a finite system, a force acting thereon is named conservative if the work said force makes in an infinitesimal neighborhood of every point, the same depends only on its boundary limits, i.e. on the starting point and the finish point, and not on the infinitesimal linking path really followed among the all possible ones, in this case the work of a conservative force is null along every path having a start and an end.

In the present implementation, as from an objective measurement and verification, the path expressed as 360 degrees rotary motion of the rotor 2' influences the system in a cause effect relation.

To simplify, if a sort of horizontal gravitational field/effect is recreated when the gravity force is acting on a body falling from an upper point to a lower one, the stated theorem is applied i.e. the body is not subject to any intermediate influence during its path during the fall from a starting point to a finish point, apart from that one of its weight and mass due to the gravity force, mechanically translating that one by the interaction effect with another magnetic body, thus being subject to a path although not being infinitesimal but delimited by the system configuration, whereby the interaction space effect can be compared with a gravity force, if the magnetic sectors are arranged in a horizontal plane, the horizontal gravitational field/effect being provided similarly with a conservative force similar to the action of the gravity force, since the magnetic fields interact with the mass of the rotating rotor giving, to the same rotor, features similar to a horizontal heavy body, instead of vertical, as can be seen in FIG. 1 the appropriate distances of the circularly placed magnets become important.

Because of such a field interaction, differing in geometrical implementation (assembly) arrangement, i.e. from horizontal to vertical unlike what reported in accordance with Torricelli Theorem, they influence the path linking the starting point and the finish point since they bring to the rotor an accelerating and/or holding interaction in the path, by virtue of to the magnetic force, by the MMF.

In confirmation of what described, if the last circularly-placed magnetic sectors or the first magnetic sectors were eliminated, in spite of the initial thrust and the verifiable acceleration pickup, the rotor would not end its rotation thus not running the whole 360 degree rotation.

If a comparison is possible, it is like a tennis ball falling from the tenth floor of a building, at each floor the object passes during the fall a hand having a tennis racket sticks out from the window of each floor to hit the ball in order to change its speed during the fall path by accelerating the arrival to the end point, or specularly by equivalence, by the counterbalancing action of dissipative energies, it would be like as if, from the ground floor after a vertical throw of the tennis ball upwards, while the ball is reaching its own top dead centre, a hand with a tennis racket would stick out from the first floor to hit the ball and give energy to the latter sufficiently to reach the second floor, then another hand would stick out from the second floor to give new energy and so on floor by floor, until the last floor is reached.

In this sense, by virtue of the arrangement of the respective magnetic fields, each of them contributes to the dissipation of non-conservative forces, such as mechanical friction and aerodynamic resistance, gravity incidence, since by applying a traction, which results in a dynamic variation, to the dynamic mass rotating of the rotor, rotation speed of the same is caused, and they sustain the rotary motion by gravitational influence.

If a comparison is possible to the cause effect conditions which, by similarity and obviously with greater effects, are found in the lowering and raising of earth tides in accordance with the point of orbital ellipse in which our satellite can be, i.e. the moon.

Thus, by similarity, balancing the effects of such forces and thus making it possible, in the invention described, the dynamic rotation of the rotor system, in a counterbalanced and reductive condition of the dissipative forces and/or energies that would affect the system, if such a gravitational- and dynamic-supporting co-traction device system was not present.

According to the present invention, the generator range we are describing is coming from the union of basic concepts of the modern synchronous machines with some novel insights.

These novel electricity generators are conceived to be industrially made by multidisciplinary emergent processes and technologies, from physics to computer science, in order to assure high competitiveness with the indispensable operation reliability.

In addition to the arrangement and principle the so-made device 100 expresses, in the measures mentioned above it may have different arrangements, therefore with greater or smaller sizes, with higher or lower powers, because, by increasing its structural sizes, machines with higher powers and performances could be implemented, or else, depending on the obvious and consequent expositions of the same principles, they could be structurally applied and configured with smaller proportions in micro-mechanical implementations or other consequent and desirable applications, therefore changing the mechanical proportions however applying the same functionality principle.

The different versions the invention may implement have the optimized efficiency as common denominator.

The size choice is determined by the assessment, case by case, of the magnitude of the device 100, the supplied voltage, since it is directly proportional to the rotation speed of the device 100.

The afore mentioned assessments depend also on the industrialization type, the respective applicable processes and the automation degree.

The modular type construction, rigorously studied in accordance with ergonomic design criteria, facilitates rational adaptation to the level of power that can be supplied and to actual operating conditions, thus also allowing excellent results in terms of production costs.

Substantially, low production costs are a significant index of energy saving and material savings (where some are non-renewable resources on the planet).

Constructive concepts, still according to the criteria of the invention, allow both very small units and units of remarkable power to be realized economically.

The system is versatile and able to be adapted to multiple needs.

The ability to exploit the type of described self-induced motion has some features that can be applied in the most different fields of electric power generation.

For example, it will be possible for the car industry to recharge the batteries without having to connect to the mains, since once a threshold has been set, the recharge can resume without interruption by starting the apparatus.

Or it is foreseeable the production of energy and heat in the most inaccessible places on the planet, which are not reached by long-distance power lines.

Or else it is still possible to predict the possibility of producing heat through electricity without the use of burning gas, oil and fuels of any kind.

Moreover, the total lack of polluting emissions and any kind of external influence factor is extremely advantageous, the apparatus not being bound to weather conditions or type of solar exposure as in case of photovoltaics, or the lack of wind in the wind field, moreover by providing energy in any mobile or immobile site, the disadvantages associated with adverse weather conditions would be canceled, such as bad weather with winds and heavy snowfalls which, as in current state of the art, may cause widespread blackouts due to interruption of long-distance power lines or aerial cables carrying the electric power.

This device is not constrained to any electric power supply but can provide in total autonomy to its power supply.

Obviously, modifications or improvements suggested by incidental or particular reasons can be made to the previously described invention without thereby departing from the scope of the invention as claimed below.

The invention claimed is:

1. Device (100) comprising a fixed supporting structure (5) on which a plurality of permanent magnets (14-29) is provided, which surround at least partially a rotating shaft (32) supporting a rotor (2') provided with a group of magnets (13) adapted to internet with the magnetic field generated by the plurality of permanent magnets (14-29+29A) of the fixed supporting structure (5), in order to produce a rotation of the rotating shaft (32) which allows an alternator (1) to be activated, characterized in that wherein the device (100) further comprises a swinging-lever assembly (40) fastened to the supporting structure (5) and provided with a plurality of magnets designed so that traction and/or thrust effects are generated upon the group of magnets (13) of the rotor (2') connected to the rotating shaft (32), wherein the swinging-lever assembly (40) provides a first group of magnets having polarity apposite to the polarity of the magnets of the group of magnets (13) of the rotor (2') in order to generate a traction effect and a second group of magnets having the same polarity of the magnets of the group of magnets (13) of the rotor (2') in order to generate a thrust effect.

2. Device (100) according to claim 1, wherein the swinging-lever assembly (40) can be rotatably operated by a servocontrol (50) supplied by the alternator (1).

3. Device (100) according to claim 1, wherein the group of magnets (13) of the rotor (2') is supported by a support (13') connected to the rotating shaft (32) through a tubular rod (2) substantially perpendicular to the rotating shaft (32).

4. Device (100) according to claim 1, wherein the orientation of the swinging-lever assembly (40) with respect to the rotor (2') allows the adjustment of the kinetic energy transferred to the group of magnets (13) of the rotor (2') by the effect of the magnetic field action.

5. Device (100) according to claim 1, wherein the magnets of the device (100) are constituted by neodymium and are nickel-plated and sintered from permanent magnetism rare-earths.

6. Device (100) according to claim 1, wherein the alternator (1) has copper coils made without the supply of ferrous or ferromagnetic materials in their inside and has the following features: rated power 14 Volts, maximum power 14 Volts, 3 to 14 AC Volts, efficiency speed max 50 rpm and pole number equal to 2.

7. Device (100) according to claim 1, wherein the alternator (1) consists of 16 neodymium magnets, which are connected to the central rotating shaft with 1:1 rotation ratio and internet with the respective coils.

* * * * *